(12) United States Patent
Matsushita

(10) Patent No.: US 6,585,068 B2
(45) Date of Patent: Jul. 1, 2003

(54) FRONT VEHICLE BODY CONSTRUCTION

(75) Inventor: Yasuhiro Matsushita, Hamamatsu (JP)

(73) Assignee: Suzuki Motor Corporation, Shizuoka (JP)

( * ) Notice: Subject to any disclaimer, the term of this patent is extended or adjusted under 35 U.S.C. 154(b) by 31 days.

(21) Appl. No.: 09/960,692

(22) Filed: Sep. 21, 2001

(65) Prior Publication Data
US 2002/0036107 A1 Mar. 28, 2002

(30) Foreign Application Priority Data

Sep. 25, 2000 (JP) .................................... 2000-290197
Aug. 7, 2001 (JP) .................................... 2001-238661

(51) Int. Cl.$^7$ ............................................. B62D 25/08
(52) U.S. Cl. ..................... 180/90; 296/188; 296/194; 296/203.02; 296/70
(58) Field of Search ........................... 180/90; 296/188, 296/190.08, 191, 194, 203.02, 70

(56) References Cited

U.S. PATENT DOCUMENTS

| 4,541,302 A | * | 9/1985 | Yamamoto et al. | ......... 74/502.4 |
| 4,789,198 A | * | 12/1988 | Ide | ............................ 296/188 |
| 5,882,065 A | * | 3/1999 | Koiwa et al. | ............... 296/188 |

FOREIGN PATENT DOCUMENTS

| JP | 57-69762 | | 7/1955 |
| JP | 3-56459 | | 12/1991 |
| JP | 406219325 A | * | 8/1994 |
| JP | 410045034 A | * | 2/1998 |
| JP | 02000177640 A | * | 6/2000 |

* cited by examiner

Primary Examiner—Peter C. English
(74) Attorney, Agent, or Firm—Myers Bigel Sibley & Sajovec

(57) ABSTRACT

A front vehicle body construction which can facilitate the attachment of a reinforcing plate to a dash panel for an automobile, and can improve the shock absorbing performance and noise, vibration and harshness performance without an increase in the number of parts and the manpower for assembling. A reinforcing plate 5 attached to a dash panel 1 is provided with an extension 51 joined to a joint portion 31 at which the dash panel 1 is joined to an inner panel 21a and an outer panel 21b of a front frame 21, an extension 52 joined to a joint portion 32 at which the dash panel 1 is joined to an apron panel 22, an extension 53 joined to a joint portion 33 at which an upper parts 23 of a front wheel housing in the dash panel 1 is joined to the reinforcing plate 5, an extension 54 joined to the periphery of a penetration portion 34 for a clutch master cylinder 45, an extension 55 joined to the periphery of a penetration portion 35 for a shift cable 49, and an extension 56 joined to the periphery of a penetration portion 36 for a heater pipe 46. The extensions 51 to 56 can be configured integrally.

7 Claims, 8 Drawing Sheets

FRONT VEHICLE BODY CONSTRUCTION

This application claims priority from Japanese Patent Application No. 2000-290197, filed Sep. 25, 2000, and Japanese Patent Application No. 2001-238661, filed Aug. 7, 2001, each of which is incorporated by reference herein in its entirety.

FIELD OF THE INVENTION AND RELATED ART STATEMENT

The present invention relates to a front vehicle body construction of an automobile.

For example, according to Japanese Utility Model Provisional Publication No. 57-69762, a vehicle body of an automobile in which a pedal bracket for a brake, a clutch, etc. is attached onto a back face of a dash panel has a construction such that a reinforcing plate is interposed only between the dash panel and the pedal bracket, and the strength of an attachment portion of the pedal bracket to the dash panel is enhanced by the reinforcing plate.

Also, according to Japanese Utility Model Publication No. 3-56459, as shown in FIG. 10, a reinforcing plate 91 is provided with an extension 94 extending to a joint portion 93 at which a dash panel 92 is joined to a front frame, and the extension 94 is joined to the dash panel 92 at the joint portion 93. In addition, a swell 95 is provided at the extension 94, and an extended pedal bracket is fixed to the swell 95 to increase the support stiffness of the pedal bracket. Also, an impact load applied to the front frame is distributed to the reinforcing plate 91 and the pedal bracket. In FIG. 10, * mark indicates a location of spot welding.

OBJECT AND SUMMARY OF THE INVENTION

However, when an attempt is made to reinforce the dash panel 92 for a purpose other than the above-described purpose, an individual reinforcing plate is needed for each portion, so that extra manpower is required for assembling.

The present invention has been made in view of the above situation, and accordingly an object thereof is to provide a front vehicle body construction which can facilitate the attachment of a reinforcing plate to a dash panel for an automobile, and can improve the shock absorbing performance and NVH performance without the increase in the number of parts and the manpower for assembling. NVH is an acronym for noise, vibration and harshness. NVH performance means characteristic items to which importance is attached when the comfortability of a vehicle is considered.

To solve the above-described problems, the present invention provides a front vehicle body construction in which a reinforcing plate for a pedal bracket is provided on the cabin side of a dash panel joined to a front frame and an apron panel, wherein the reinforcing plate is provided with a first extension extending to a first joint portion at which the dash panel is joined to the front frame so as to be joined to the first joint portion and a second extension extending to a second joint portion at which the dash panel is joined to the apron panel so as to be joined to the second joint portion.

The reinforcing plate is further provided with a third extension at which an upper part of a front wheel housing in the dash panel is joined to said reinforcing plate.

The reinforcing plate is further provided with a fourth extension at which the periphery of a penetration portion for a clutch operating member in the dash panel is joined to said reinforcing plate.

The reinforcing plate is further provided with a fifth extension at which the periphery of a shift cable penetration portion in the dash panel is joined to said reinforcing plate and a sixth extension at which the periphery of a heater pipe penetration portion in the dash panel is joined to said reinforcing plate.

The first to sixth extensions are configured integrally.

As described above, the reinforcing plate is provided with the first extension extending to the first joint portion at which the dash panel is joined to the front frame so as to be joined to the first joint portion and the second extension extending to the second joint portion at which the dash panel is joined to the apron panel so as to be joined to the second joint portion. Therefore, when an impact force is applied, the front frame and the apron panel can be prevented from intruding into a cabin. Also, the dash panel can be prevented from being deformed by forces transmitted from a suspension attachment portion and the apron panel at the time of light shock, and also the strength and stiffness of vehicle body can be improved.

If the reinforcing plate is further provided with the third extension at which the upper part of the front wheel housing in the dash panel is joined thereto, the dash panel and the upper part of the front wheel housing can be prevented from being deformed by forces transmitted from a front suspension and the apron panel at the time of light shock.

If the reinforcing plate is further provided with the fourth extension at which the periphery of the penetration portion for the clutch operating member in the dash panel is joined thereto, sounds transmitted from the clutch operating member such as a clutch master cylinder or a clutch cable can be suppressed, so that the product quality can be upgraded.

If the reinforcing plate is further provided with the fifth extension at which the periphery of the shift cable penetration portion in the dash panel is joined thereto and the sixth extension at which the periphery of the heater pipe penetration portion in the dash panel is joined thereto, sounds and vibrations transmitted from the shift cable and the heater pipe can be suppressed, so that the product quality can be upgraded.

If the reinforcing plate is further provided with the fourth extension at which the periphery of the penetration portion for the clutch operating member in the dash panel is joined thereto, the fifth extension at which the periphery of the shift cable penetration portion in the dash panel is joined thereto, and the sixth extension at which the periphery of the heater pipe penetration portion in the dash panel is joined thereto, and the first to sixth extensions are configured integrally, the manpower for assembling the reinforcing plate can be reduced, and the stiffness of the dash panel can be increased significantly.

DETAILED DESCRIPTION OF PREFERRED EMBODIMENTS

An embodiment of a front vehicle body construction in accordance with the present invention will now be described with reference to the accompanying drawings.

Figure 1:
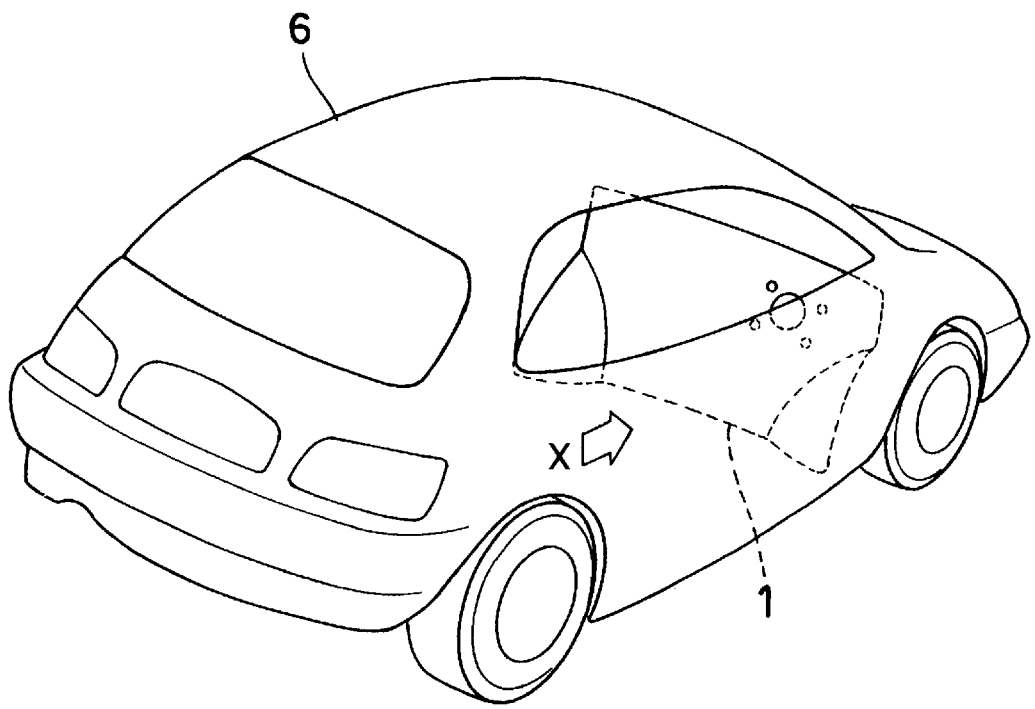
FIG. 1 is a perspective view of an automobile to which a front vehicle body construction in accordance with one embodiment of the present invention is applied.
Figure 2:
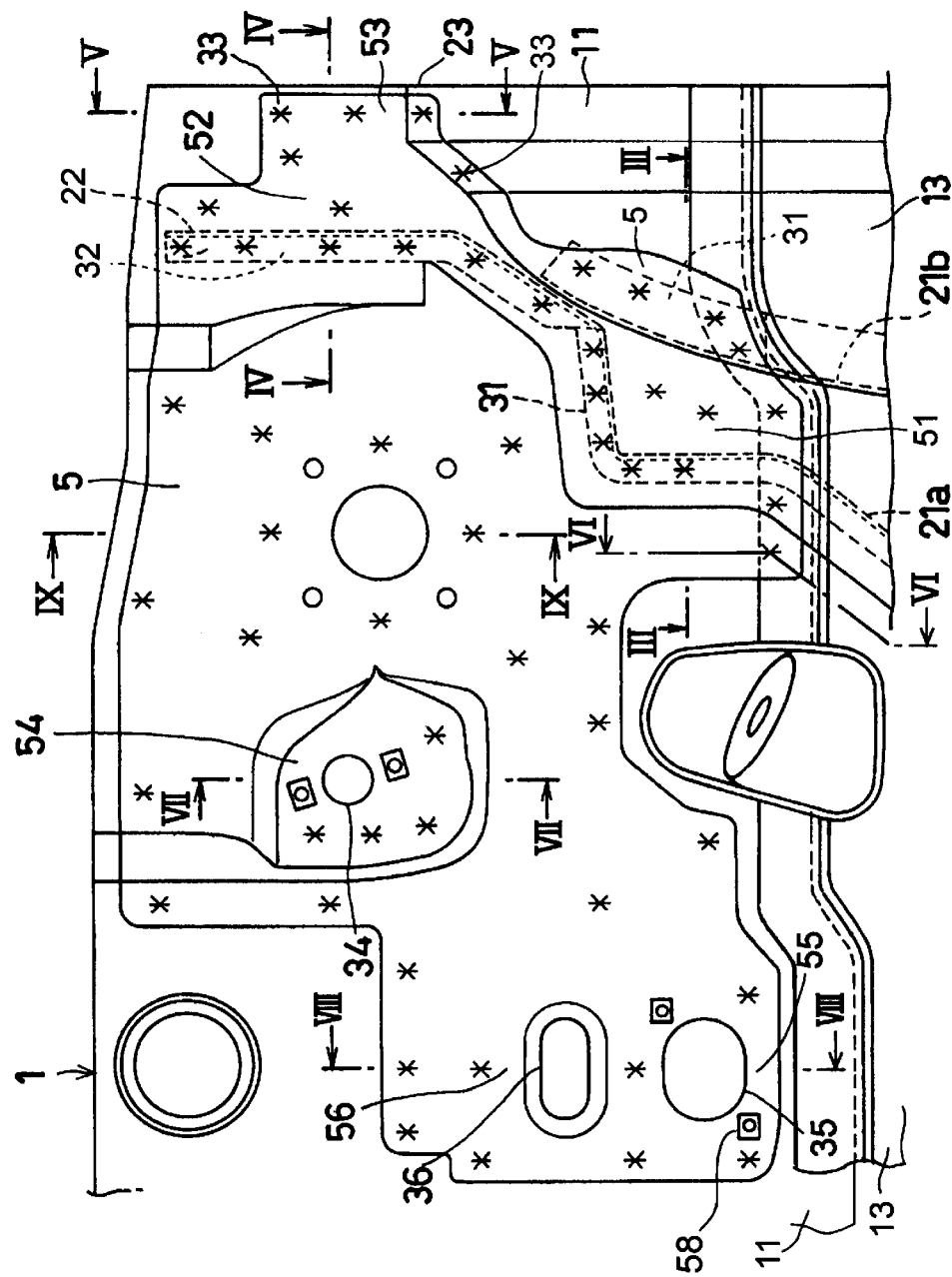
FIG. 2 is a view showing a front vehicle body construction, taken in the direction of arrow X of FIG. 1.
Figure 3:
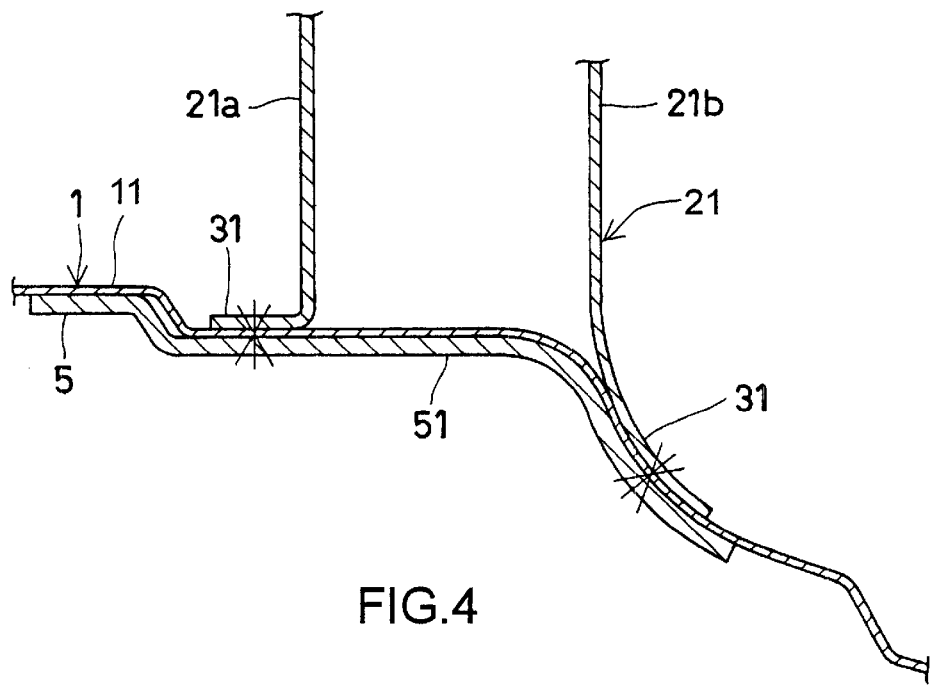
FIG. 3 is a sectional view taken along the line III—III of FIG. 2.
Figure 4:
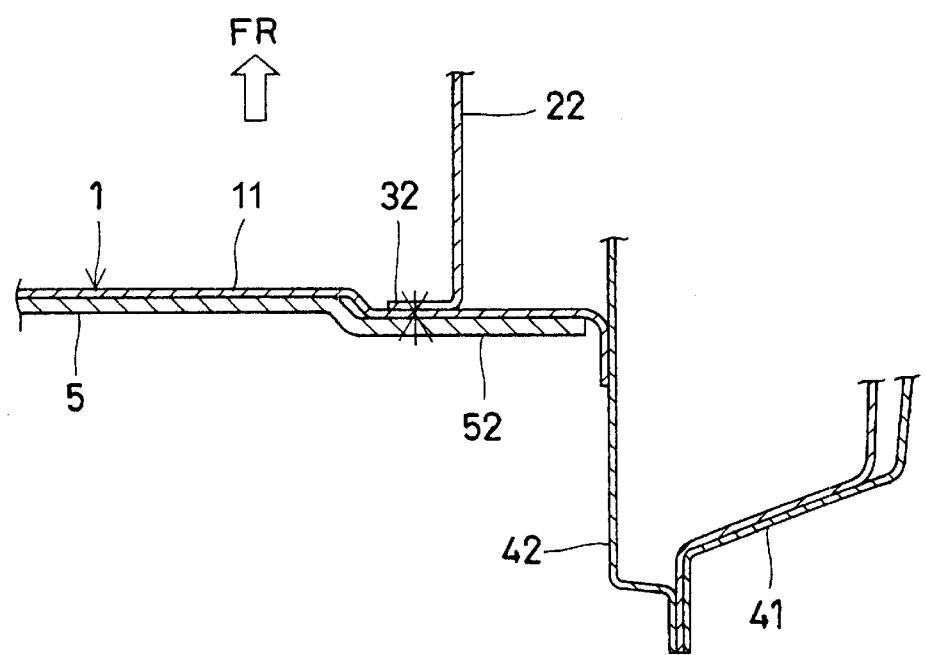
FIG. 4 is a sectional view taken along the line IV—IV of FIG. 2, additionally showing a side body outer panel and a dash side panel.
Figure 5:
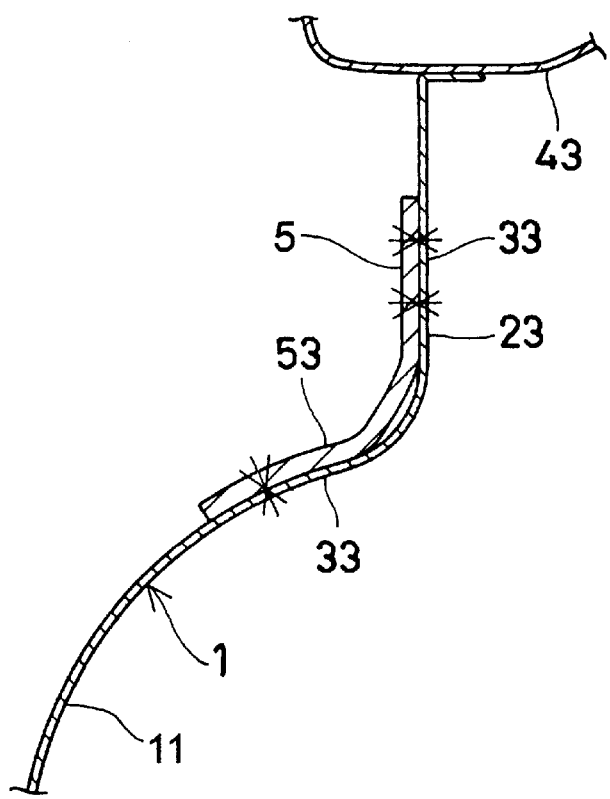
FIG. 5 is a sectional view taken along the line V—V of FIG. 2, additionally showing a cowl upper panel.
Figure 6:
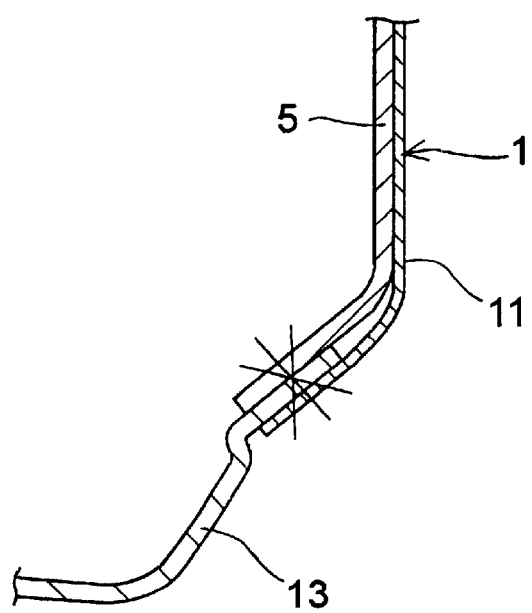
FIG. 6 is a sectional view taken along the line VI—VI of FIG. 2.

FIG. 1 is a schematic perspective view of an automobile 6 to which the present invention is applied. The automobile 6 is provided with a dash panel 1 at the foremost end portion of a cabin. The dash panel 1, which is a partition between an engine room and the cabin, has an upper panel 11, a reinforcing plate 5, and a thick lower panel 13 as constituent elements as shown in FIG. 2. The upper panel 11 and the lower panel 13 are joined by welding, and the reinforcing plate 5 is joined to the upper panel 11 by welding and also joined to the lower panel 13 by welding (see FIG. 6). The dash panel 1 is joined to various adjacent members. Specifically, the dash panel 1 is joined to an inner panel 21a and an outer panel 21b of a front frame 21 at a joint portion 31 (see FIG. 3). Also, the dash panel 1 is joined to an apron panel 22 at a joint portion 32 (see FIG. 4), and includes an upper part 23 of a front wheel housing having at a joint portion 33 (see FIG. 5). Also, the dash panel 1 is joined to a dash side panel 42 joined to a side body outer panel 41 (see FIG. 4) and a cowl upper panel 43 (see FIG. 5 or 7). The dash panel 1 is fitted with a clutch master cylinder 45 connected to a clutch pedal 44 (see FIG. 7), a heater pipe 46 (see FIG. 8), and a brake booster 47 (see FIG. 9). Further, the dash panel 1 has a penetration portion 34 for a clutch operating member such as the clutch master cylinder 45 (see FIG. 7) or a clutch cable (not shown), a penetration portion 35 for a shift cable 49 (see FIG. 8), and a penetration portion 36 for the heater pipe 46 (see FIG. 8). In FIG. 2, * mark indicates a location of spot welding.

As shown in FIG. 2, the dash panel 1 has the reinforcing plate 5. The reinforcing plate 5 is provided with an extension (a first extension) 51 extending to the joint portion 31 at which the dash panel 1 is joined to the front frame 21 (see FIG. 3), an extension (a second extension) 52 extending to the joint portion 32 at which the dash panel 1 is joined to the apron panel 22 (see FIG. 4), and an extension (a third extension) 53 extending to the upper part 23 of the front wheel housing in the dash panel 1 (see FIG. 5). The reinforcing plate 5 is also provided with an extension (a fourth extension) 54 extending to the penetration portion 34 for the clutch operating member in the dash panel 1 (see FIG. 7), an extension (a fifth extension) 55 at which the reinforcing plate 5 is joined to the periphery of the shift cable penetration portion 35 (see FIG. 8), and an extension (a sixth extension) 56 at which the reinforcing plate 5 is joined to the periphery of the heater pipe penetration portion 36 (see FIG. 8). The reinforcing plate 5 is also joined to a pedal bracket 12 (see FIG. 9).

Since the reinforcing plate 5 constructed as described above is attached to the dash panel 1, this embodiment achieves the following effects:

(1) The extension 51 of the reinforcing plate 5 is joined to flanges of the inner panel 21a and outer panel 21b of the front frame 21 via the dash panel 1. Thereby, an impact load applied to the dash panel 1 from the front frame 21 is distributed, and also loads transmitted from a suspension and tire can be distributed. Therefore, deformation in the dash panel 1 is restrained, and deformation intruding into the cabin is restrained, so that leg injury of passengers can be reduced. Additionally, the strength and stiffness of the vehicle body are improved. Furthermore, since the reinforcing plate 5 is also joined to the thick lower panel 13, shock is absorbed and distributed, which contributes to the increase in strength and stiffness of vehicle body.

(2) The extension 52 of the reinforcing plate 5 is joined to a rear end flange of the apron panel 22 via the dash panel 1. Thereby, an impact load applied to the dash panel 1 from the apron panel 22 is distributed. Therefore, deformation in the dash panel 1 is restrained, and deformation intruding into the cabin is restrained, so that leg injury of passengers can be reduced. Also, at the time of light shock, loads transmitted from a suspension attachment portion and a load transmitted from the apron panel 22 are distributed, so that deformation in the dash panel 1 is restrained, which enables a reduction in the repair cost borne by the user.

(3) Also, the extension 53 of the reinforcing plate 5 is joined to locations 33, 33 of the dash panel 1 on the upper part 23 of the front wheel housing. Thereby, the stiffness of the upper part 23 of the front wheel housing is increased, so that at the time of light shock, loads transmitted from the suspension attachment portion and a load transmitted from the apron panel 22 are distributed. Therefore, deformation in the dash panel 1 and the upper part 23 of the front wheel housing is restrained, which enables a reduction in the repair cost borne by the user.

Figure 7:
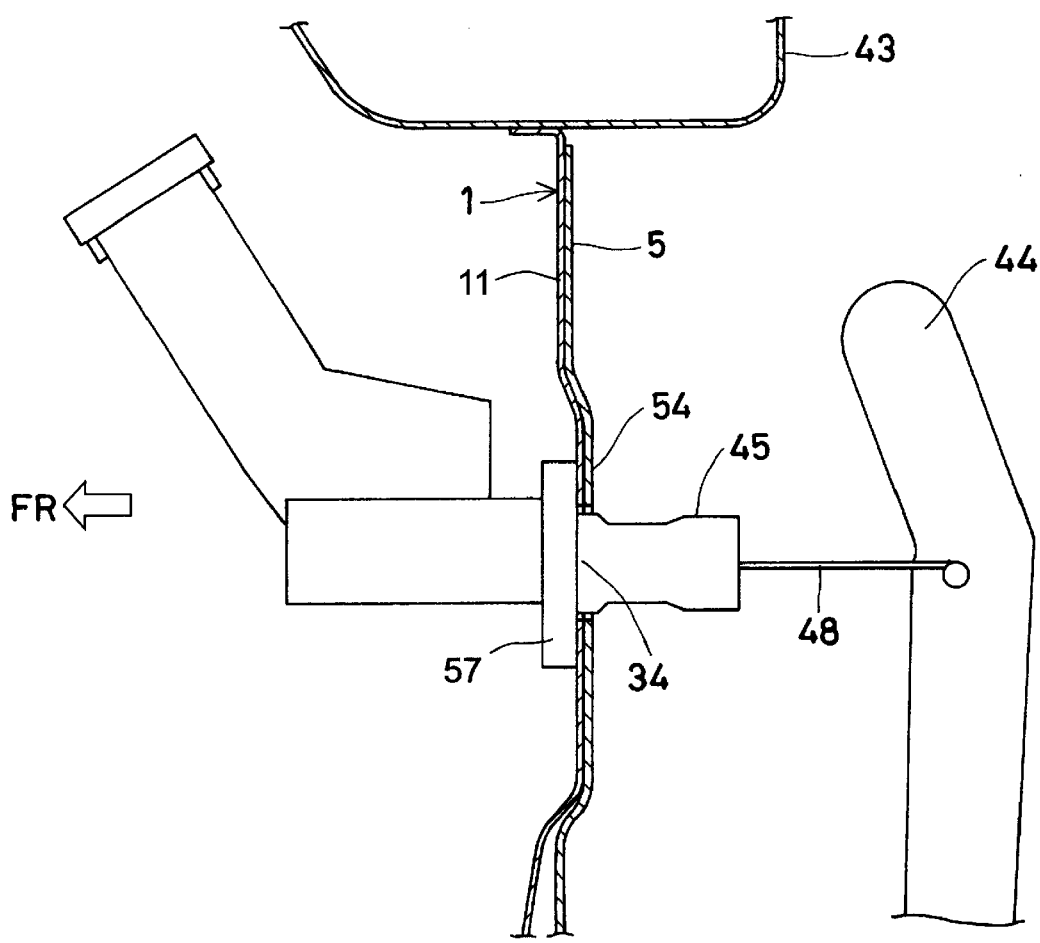
FIG. 7 is a sectional view taken along the line VII—VII of FIG. 2, additionally showing a cowl upper panel, the figure showing a state in which a clutch master cylinder and other parts are mounted.

(4) The extension 54 of the reinforcing plate 5 is joined so as to cover the periphery of the penetration portion 34 for the clutch operating member, a clutch master cylinder attaching nut 57 is provided, and the clutch master cylinder 45 is installed as illustrated in FIG. 7. Thereby, the stiffness of the penetration portion 34 for the clutch operating member is increased, and sounds transmitted from an operating rod 48 are suppressed so that the NVH performance can be improved. In this specification, the NVH performance means characteristic items to which importance is attached when the comfortability of car is considered, NVH being an acronym for noise, vibration, and harshness.

Figure 8:
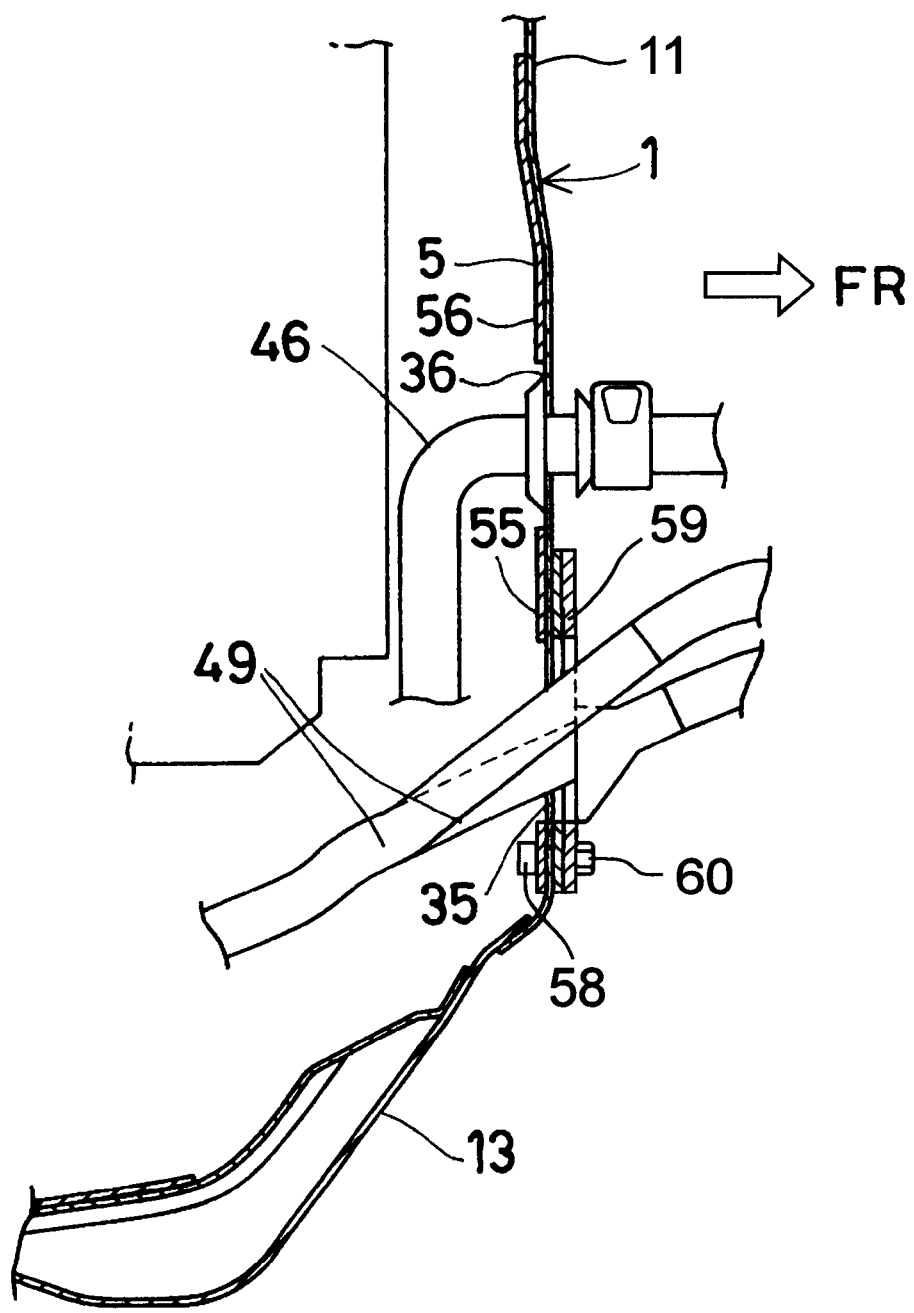
FIG. 8 is a sectional view taken along the line VIII—VIII VIII of FIG. 2, showing a state in which a heater pipe, a shift cable, and other parts are mounted.
Figure 9:
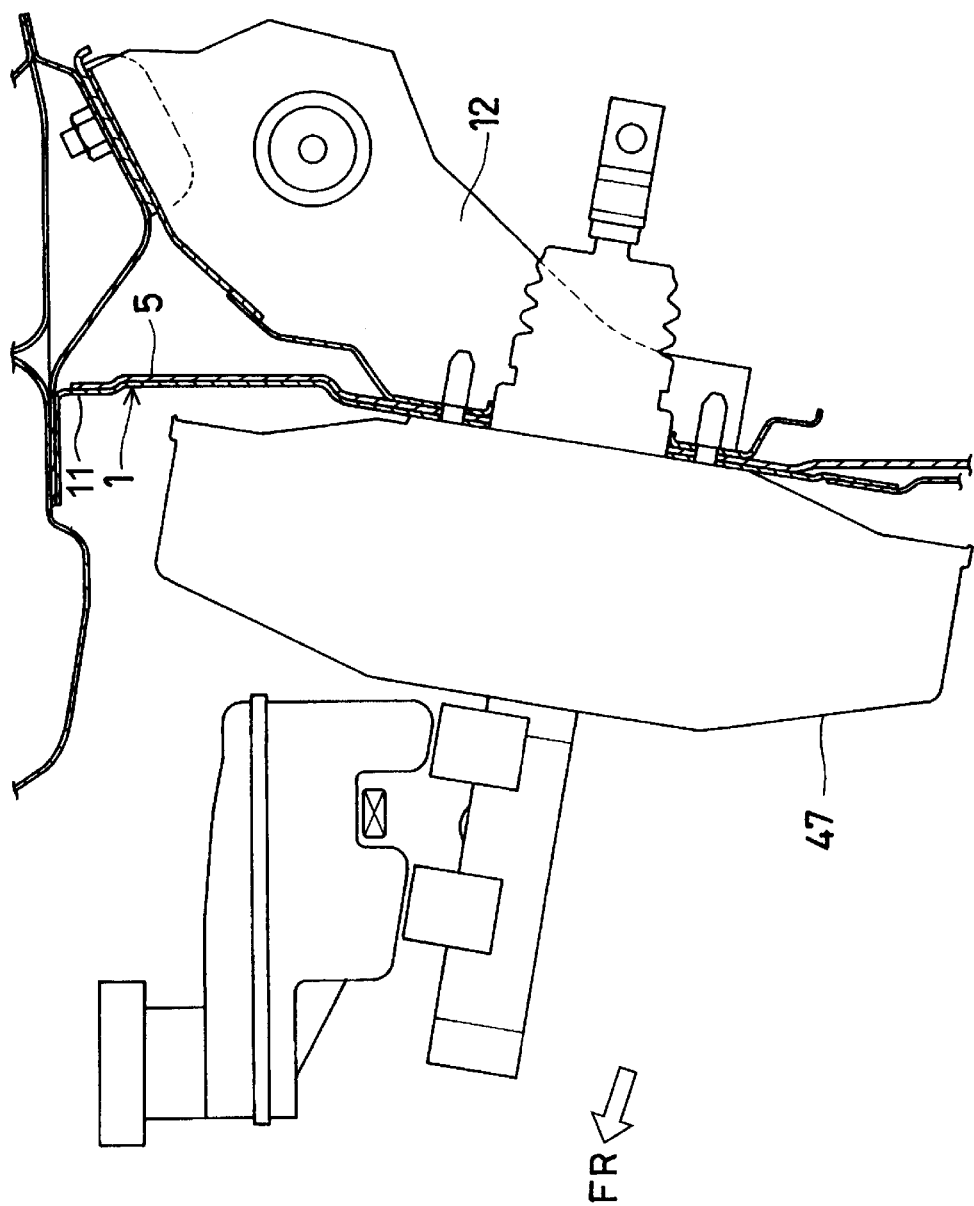
FIG. 9 is a sectional view taken along the line IX—IX of FIG. 2, showing a state in which a brake booster and other parts are mounted.
Figure 10:
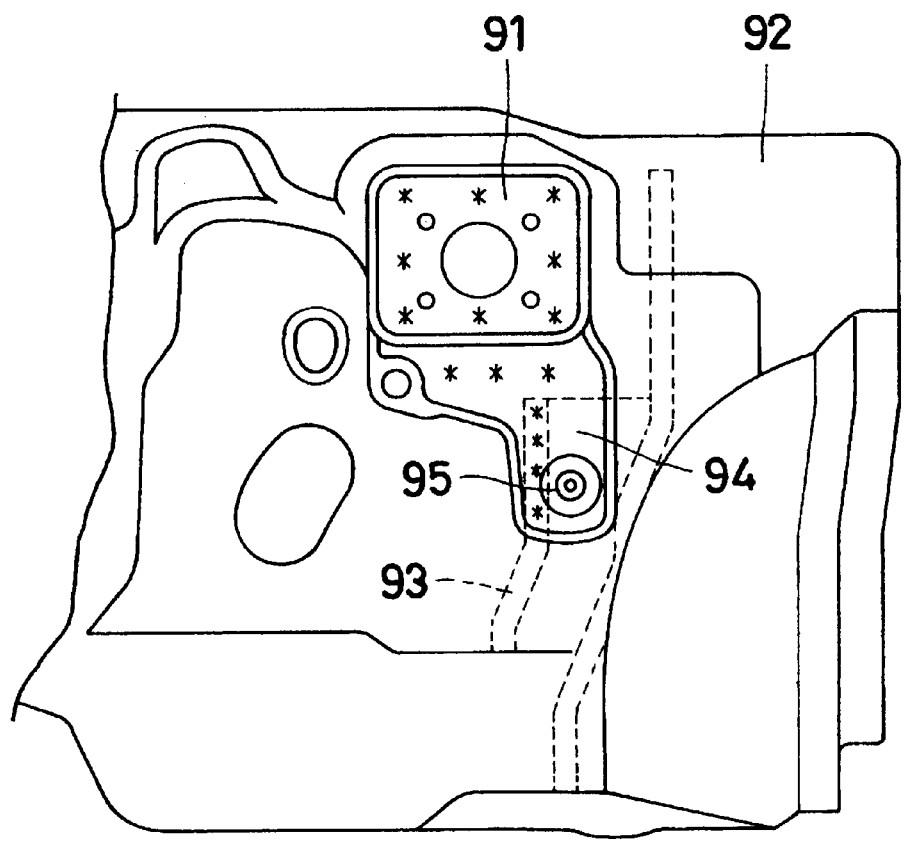
FIG. 10 is a view showing a front vehicle body construction of the prior art.

(5) The extension 55 of the reinforcing plate 5 is joined so as to cover the periphery of the shift cable penetration portion 35, shift cable attaching nuts 58 are attached to the reinforcing plate 5 by welding, and a shift cable seal portion 59 is installed by means of shift cable attaching bolts 60 as illustrated in FIG. 8. Thereby, the stiffness of the shift cable penetration portion 35 is increased, and sounds and vibrations transmitted from the shift cable 49 are suppressed so that the NVH performance can be improved.

(6) The extension 56 of the reinforcing plate 5 contacts the periphery of the heater pipe penetration portion 36, by which sounds and vibrations transmitted from an engine via the heater pipe 46 are suppressed, so that the NVH performance can be improved.

As described above, the integral configuration of the reinforcing plate 5 having the extensions can significantly reduce the manpower for assembling, can increase the stiffness of the whole of the dash panel 1, and can improve the NVH performance. In providing the extensions integral with the reinforcing plate 5, any one or a plurality of locations of the upper part 23 of the front wheel housing, the penetration portion 34 for the clutch operating member, and the shift cable penetration portion 35 may be omitted. In the figures, an arrow mark FR indicates the vehicle front direction.

I claim:

1. A front vehicle body construction in which a reinforcing plate for a pedal bracket is provided on a cabin side of a dash panel joined to a front frame and an apron panel, wherein said reinforcing plate is provided with an extension for the dash panel and the front frame extending to a first joint portion at which said dash panel is joined to said front frame so as to be joined to said first joint portion and an extension for the dash panel and the apron panel extending to a second joint portion at which said dash panel is joined to said apron panel so as to be joined to said second joint portion.

2. The front vehicle body construction according to claim 1, wherein said reinforcing plate is further provided with an extension for a front wheel housing which an upper part of a front wheel housing in said dash panel is joined thereto.

3. The front vehicle body construction according to claim 2, wherein said reinforcing plate is further provided with an extension for a penetration portion for a clutch operating member at which the periphery of a penetration portion for a clutch operating member in said dash panel is joined thereto.

4. The front vehicle body construction according to claim 2, wherein said reinforcing plate is further provided with an extension for a penetration portion for a clutch operating member at which the periphery of a penetration portion for a clutch operating member in said dash panel is joined thereto, an extension for a shift cable penetration portion at which the periphery of a shift cable penetration portion in said dash panel is joined thereto, and an extension for a heater pipe penetration portion at which the periphery of a heater pipe penetration portion in said dash panel is joined thereto, and said extensions for a shift cable penetration portion and for a heater pipe penetration portion are configured integrally.

5. The front vehicle body construction according to claim 1, wherein said reinforcing plate is further provided with an extension for a penetration portion for a clutch operating member at which the periphery of a penetration portion for a clutch operating member in said dash panel is joined thereto.

6. The front vehicle body construction according to claim 1, wherein said reinforcing plate is further provided with an extension for a shift cable penetration portion at which the periphery of a shift cable penetration portion in said dash panel is joined thereto.

7. The front vehicle body construction according to claim 1 further comprising an extension for a heater pipe penetration portion at which the periphery of a heater pipe penetration portion in said dash panel is joined thereto.

* * * * *

UNITED STATES PATENT AND TRADEMARK OFFICE
CERTIFICATE OF CORRECTION

| | | |
|---|---|---|
| PATENT NO. | : 6,585,068 B2 | Page 1 of 1 |
| DATED | : July 1, 2003 | |
| INVENTOR(S) | : Matsushita | |

It is certified that error appears in the above-identified patent and that said Letters Patent is hereby corrected as shown below:

<u>Column 4,</u>
Lines 44-47, please delete "In this specification, the NVH performance means characteristic items to which importance is attached when the comfortability of car is considered, NVH being an acronym for noise, vibration, and harshness."

<u>Column 5,</u>
Line 20, should read -- extension for a front wheel housing at which an upper part of --

Signed and Sealed this

Ninth Day of December, 2003

JAMES E. ROGAN
*Director of the United States Patent and Trademark Office*